United States Patent [19]
Horn et al.

[11] Patent Number: 6,085,183
[45] Date of Patent: Jul. 4, 2000

[54] INTELLIGENT COMPUTERIZED CONTROL SYSTEM

[75] Inventors: Hannes Schulze Horn, Gladbeck; Jürgen Adamy, Igensdorf, both of Germany

[73] Assignee: Siemens Aktiengesellschaft, Munich, Germany

[21] Appl. No.: 08/913,127

[22] PCT Filed: Mar. 6, 1996

[86] PCT No.: PCT/DE96/00396

§ 371 Date: Dec. 29, 1997

§ 102(e) Date: Dec. 29, 1997

[87] PCT Pub. No.: WO96/28771

PCT Pub. Date: Sep. 19, 1996

[30] Foreign Application Priority Data

Mar. 9, 1995 [DE] Germany .......................... 195 08 474

[51] Int. Cl.[7] .................................................. G06N 17/00
[52] U.S. Cl. .............................. 706/45; 706/46; 706/47
[58] Field of Search ..................... 395/706, 709; 706/47, 4, 14, 45, 46; 434/428, 468

[56] References Cited

U.S. PATENT DOCUMENTS

| | | | |
|---|---|---|---|
| 4,512,747 | 4/1985 | Hitchens et al. | 434/428 |
| 5,161,110 | 11/1992 | Dorchak | 364/468 |
| 5,179,631 | 1/1993 | Guddanti et al. | 434/428 |
| 5,259,066 | 11/1993 | Schmidt | 706/50 |
| 5,644,686 | 7/1997 | Hekmaptour | 706/45 |
| 5,727,127 | 3/1998 | Schulze Horn et al. | 706/52 |
| 5,787,235 | 7/1998 | Smith et al. | 706/47 |
| 5,806,056 | 9/1998 | Hekmatpour | 706/50 |
| 5,870,768 | 2/1999 | Hekmatpour | 707/501 |

FOREIGN PATENT DOCUMENTS

| | | |
|---|---|---|
| 0 411 962 | 8/1990 | European Pat. Off. . |
| 43 01 130 | 7/1993 | Germany . |
| 43 19 926 | 12/1993 | Germany . |
| 43 23 439 | 1/1995 | Germany . |
| 2 267 979 | 12/1993 | United Kingdom . |
| 93/08515 | 4/1993 | WIPO . |
| 94/29773 | 12/1994 | WIPO . |

OTHER PUBLICATIONS

Nowinski G: "Lernfähige Konnektionistische Structuren in der Automatisierungstechnik Connectionistic Structures with the ability of learning in automatic control", Automatisierungstechnik—AT, vol. 42, No. 11, Nov. 1, 1994, pp. A37–40, XP000483092. Translation of the International Search Report.

V. Rembold, "Methoden der Kunchenstlichen Intelligenz in der industriellen Fertigung", TR Technische Rundschau, 1992, pp. 66–71.

S. Kendra et al., "Intelligent Process Control with Supervisory Knowledge–Based Systems", IEEE Control Systems, Jun. 1994, pp. 37–47.

H. PreiBl et al., "Process optimization for maximum availability in continuous casting", der Zeitschrift Metallurgical Plant and Technology International, May 1994, pp. 52–58.

W.J. Leech: "A rule based process control method with feedback", Advances in Instrumentation, vol. 41, No. 1, 1986, Research Triangle Park US, pp. 169–175.

ABB Technik Jun./Jul. 1994, pp 38–46.

A. Varsek Et a.: "Genetic algorithms in controller design and tuning", IEEE Transactions on Systems, Man and Cybernetics, vol. 23, No. 5, 1993, New York US, pp. 1330–1339.

(List continued on next page.)

*Primary Examiner*—Tariq R. Hafiz
*Assistant Examiner*—Anil Khatri
*Attorney, Agent, or Firm*—Kenyon & Kenyon

[57] ABSTRACT

Intelligent computerized control system for facilities in which goal-oriented technical or biological processes take place, the control system being designed to build on previously input knowledge to determine automatically, from the results of the processes taking place in such facilities, the process status and to give appropriate computer-generated instructions for achieving the objective of the process in a manner appropriate for the situation.

9 Claims, 5 Drawing Sheets

OTHER PUBLICATIONS

Centeno et al,"Databases and artificial intelligence: enabling technologies for simulation modeling", Proc. of the winter simulation conf., pp. 181–189, 1992.

Almanzor et al, "The model methodolgy, model specifications and development of CASE CASE/Architecture simulation integration", Proc. of winter simulation conf. pp. 657–661, 1993.

Rozenbilt et al", Towards an implemention of a knowledge based system design and simulation environment", Proc. of winter simulation conf. pp 226–230, 1988.

Kunnathur et al, "Dynamic rescheduling of job shop: a simulation study", Proc. of winter simulation conf., pp. 1091–1098, 1996.

Hopkinson et al, "Real time validation of man in the loop simulations", Proc. of winter simulation conf., pp. 1250–1256, 1995.

Manivannan et al, "Real time control of a manufacturing cell useing knowledge based simulation", Proc. of winter simulation conf., pp. 251–260, 1991.

Ducasse et al, "A review of automated debugging system: Knowledge, strategies and techniques", IEEE, pp. 162–171, 1988.

Tiben, Knowledge bases for user guidance in information seking dialogues, ACM IUI, pp 149–156, Jul. 1992.

Luh et al., "Abstraction morphisms for world modelling in high autonomy systems", Proc. of winter simulation conf. pp. 1129–1138, 1991.

Factor et al. " The process trellis: a software architecture for intelligent monitors", Tools for artificial intelligence TAI 89, pp. 174–180, Oct. 1989.

Fox et al., "The role of database in knowledge based system", On knowledge base management system, pp. 407–430, 1986.

Rabelo et al., "Synergy of artificial neuarl networks and knowledge based expert system for intelligent FMS scheduling", Synergy of artificial, pp. 359–366, Jun. 1990.

Lee, "A self learning rule based controller employing approximate reasoning and neural net concepts", Int. Jor. of Intelligent Sys., vol. 6, pp. 71–93, 1991.

INTELLIGENT COMPUTERIZED CONTROL SYSTEM

FIELD OF THE INVENTION

The present invention relates to an intelligent computerized control system for equipment in which technical or biological processes take place in a controlled manner, such as facilities for the production of goods or energy, communications facilities, etc., where the control system is designed to build on previously input knowledge to determine automatically, from the results of the processes taking place in such facilities, e.g., continuous manufacturing processes, work processes, etc., the respective status of the processes taking place in the facilities, and to give computer-generated instructions for achieving the objective of the process in a manner appropriate for the situation.

BACKGROUND INFORMATION

In industrial facilities, such as systems for manufacturing goods, power or for communication, etc., there has long been a demand for a control system that provides the best possible, automatic, intelligent management of the ongoing process in a reliable and inexpensive manner. There has also been a demand for an evolutionary self-improvement of the control system.

Control systems using so-called intelligent components are already known from the related art. For example, International Patent Application No. WO 93/08515 describes a control system for technical processes which works with knowledge-based control rules for selected process states. The control parameters for the other process states are formed in the apparatus using a continuous mathematical function that links knowledge-based control rules and thus creates control rules for all process states—in the manner of a non-linear interpolation. This conventional apparatus is not designed to act automatically in a controlled manner with regard to achieving a better process performance. The human operator's intelligence is still indispensable. This conventional apparatus does not provide for an evolutionary self-development of the intelligent components.

Another expert system is described in the article "The MODI expert system—a contribution toward reliable and cost-effective management of power plants, *ABB Technik ABB Technology*, 6/7 (1994) pages 38–46. This conventional system monitors the status of power plant processes by comparing characteristic features with a mathematical reference model and, when there are deviations from normal behavior, analyzing the causes. The plant-wide approach of this conventional expert system permits statements regarding the process as a whole, but automatic, self-optimizing process management is not possible with this expert system.

In addition, a computerized control system that uses models to automate the continuous casting of steel and monitors product quality is described in the article "Process optimization for maximum availability in continuous casting" in the journal *Metallurgical Plant and Technology International*, vol. 5 (1994) pages 52–58. This is accomplished using graphic plots, i.e., via a human-machine interface. This conventional control system likewise does not provide for automatic intelligent process control.

A control system described in European Patent Application No. 0 411 962 is provided specifically for continuous casting of steel and operates similarly. Here again, test runs in the plant provide the basis for the expert knowledge, which is used in the form of limit curves. There is no continuous or stepwise, automatic computerized optimization.

The systems described above, which work with intelligent components, do not achieve the quality of the object of the present invention.

SUMMARY OF THE INVENTION

An object of the present invention is to provide a control system which, as an intelligent system, permits the best possible, automatic, intelligent management of an ongoing process in a reliable and cost-effective manner while being capable of evolutionary self-improvement and being applicable to a wide range of facility types.

In particular, through conventional control technology or computer technology, partial processes that cannot be controlled especially well are to be optimized, taking into account reaction effects, so that process management is possible in an inexpensive manner with the help of simple actuators that can be preset or by simple technical process measures.

It is important for a generally accepted process and plant control system to operate reliably. Therefore, according to the present invention the control system advantageously has a basic function system supplementing the computerized intelligent part and converting the instructions obtained from the computer-based knowledge to reliable process management and plant function.

The basic-function system is designed as a subsystem that makes the installation components reliably operational, either individually or together, e.g., on the basis of the conditions for mass flow regulation, input quantity limit values, etc. Together with safety circuits, e.g., for the drives in the form of a high-availability system, the operational reliability required for facilities for the production of goods or energy, etc., is achieved. Thus, reliable plant operation, although on a less than optimum basis, is guaranteed even in the event of a failure or malfunction of the intelligent computerized system.

To bring the system into a safe state in the event of a failure or malfunction of individual components of the intelligent control according to the present invention system, the subsystem that guarantees a safe status of the installation or process falls back on the operating parameters, process sequences, etc., that have been calculated or identified as safe and are preferably stored separately in the form of tables. This is especially important for plants that could reach a hazardous state (risk of explosion, spontaneous destruction).

It is advantageous for the basic function system to have start-up and ramp-up routines that can be entered manually or automatically, and in particular, it is advantageous that there are operating routines in which individual instructions, otherwise computer generated, to be replaced by constant setpoints. Constant setpoints may include constant material qualities, constant flow rates of material, constant coolant flow rates, etc., so that considerable portions of the model generation can be deferred at first, in particular in the start-up phase of a plant. This is especially advantageous either when complete plant information is not yet available, e.g., in parts of the plant where phase transitions of the material take place and no sensors are available because of a high process temperature (in solidification of steel or in processes taking place inside a high-temperature fuel cell) to provide information about the specific process characteristics in this part of the plant or when training data have not yet been compiled for a neural network. In such a case, it is possible to work entirely or partially with constant setpoints or with limited changes in setpoints until detailed process information becomes available.

In the embodiment of the intelligent part of the control system, according to the present invention the process is simulated on the basis of a process model. The simulation is modular in particular and describes the behavior between the process input variables as well as the control variables and the process output variables, i.e., the quantitative and qualitative characteristics of the resulting product. In such model describing a process and being modular in generation and optimization, the possibility of continuous adaptation and optimization without having to intervene in the process itself is also advantageous (in addition to the possibility of process management by adaptation of the parameters, and the like, of the model). All conventional adaptation and optimization methods can be advantageously used. In addition, it is further advantageous that limit states can also be calculated on the basis of the model, providing information about critical plant characteristics.

The process model is contained in mathematical forms of description as much as possible. These permit accurate predictions of process characteristics. For those parts of the installation for which process information is available in a form that can only be expressed linguistically, linguistically formulated model portions are used, such as fuzzy systems, neuro-fuzzy systems, expert systems, or spreadsheets. Thus, it is possible to model even process portions that cannot be described physically, where the intended processes can be understood and evaluated relatively easily. For subprocesses for which little or no information is available, it is advantageous if an adaptive neural network is used as a model part, with the adaptability also including the structure of the neural network. Since these parts of the model, whose internal function is unknown, constitute only a small portion of the total model, these gaps in plant information, which are filled up in a purely functional regard, are acceptable. It is advantageous to use as the neural networks simple feed-forward networks that are improved by back-propagation.

For optimization by improved models, genetic algorithms in particular are suitable in addition to other optimization strategies. With these routines, there is a high probability of actually finding the feasible optimum or another very good suboptimal extreme. The suitability of the strategy of computations with genetic algorithms, etc. can be tested in particular by a neural network that determines the values running in the direction of a global optimum. This optimization preferably takes place off-line because of the high computation intensiveness.

Off-line computation is also recommended for parameter adaptation of the model, except for the model parts that describe plant parts with rapid dynamic processes.

The start values for an optimization process are also determined on the basis of operating data archived in the process data memory, as in the adaptation processes; this is advantageous because the process is accelerated. In optimization processes, e.g., when the optimization result is unsatisfactory, however, it may also be advantageous to begin with completely new output data. This prevents the optimization process from taking place only in a side range of the global optimum. This is true in particular when the structure of the model is uncertain, in which case it is advisable to perform new optimizations with a revised model and new starting values. The optimizations are performed in an optimizer, a computer unit intended for this purpose.

The embodiment of the present invention provides that the process variables, which are determined by the optimizer off-line on the basis of the process model in such a way that the product's characteristic values simulated by the model match the desired preset values as closely as possible, are given as setpoint values to the basic function system of the process, and the process is adjusted by this system according to the control commands. This yields reliable process control, in addition to which further optimization is possible at the same time.

The embodiment of the present invention also provides that the preliminary knowledge is constantly being improved through information obtained on the process internally by computerized methods, e.g., at different operating points, during production, and this internally generated process information is transferred to a data memory, in particular a data memory that is constantly updated. This procedure yields a continuous and advantageous expansion of the previous information about the installation and its characteristics.

The setpoint values for the basic function system, which are generated directly from the data in the process database in the event of a failure, or the like, in the intelligent part of the control system, are directly obtained from the process data bank data using an interpolation process, in particular by a fuzzy interpolation. This yields a control system operation close to the optimum operating point even in the event of a failure or malfunction of the intelligent part of the control system.

The setpoint values for the basic function system and the basic knowledge are improved routinely by external simulation calculations, model testing, etc., in particular in adapting to changes in the technical means of the plant components or to an altered plant design. Thus, it is possible to adapt to technological progress at any time, in which case the modular design of the control system is especially fortuitous. External simulation calculations, model testing, etc., can be of particular help to ascertain whether and how plant improvements can result in a corresponding product improvement.

The control system described above may be used for autonomous mobile service robots, and the like. It is desirable that, such robots should have human behavior. For stationary industrial plants that are far more complex and must continuously and reliably achieve optimum production results, however, such control systems have previously seemed remote in particular since intelligent behavior cannot be deduced from human behavior for industrial plants where complex processes take place, in contrast with service robots, etc.

DETAILED DESCRIPTION OF THE INVENTION

Figure 1:
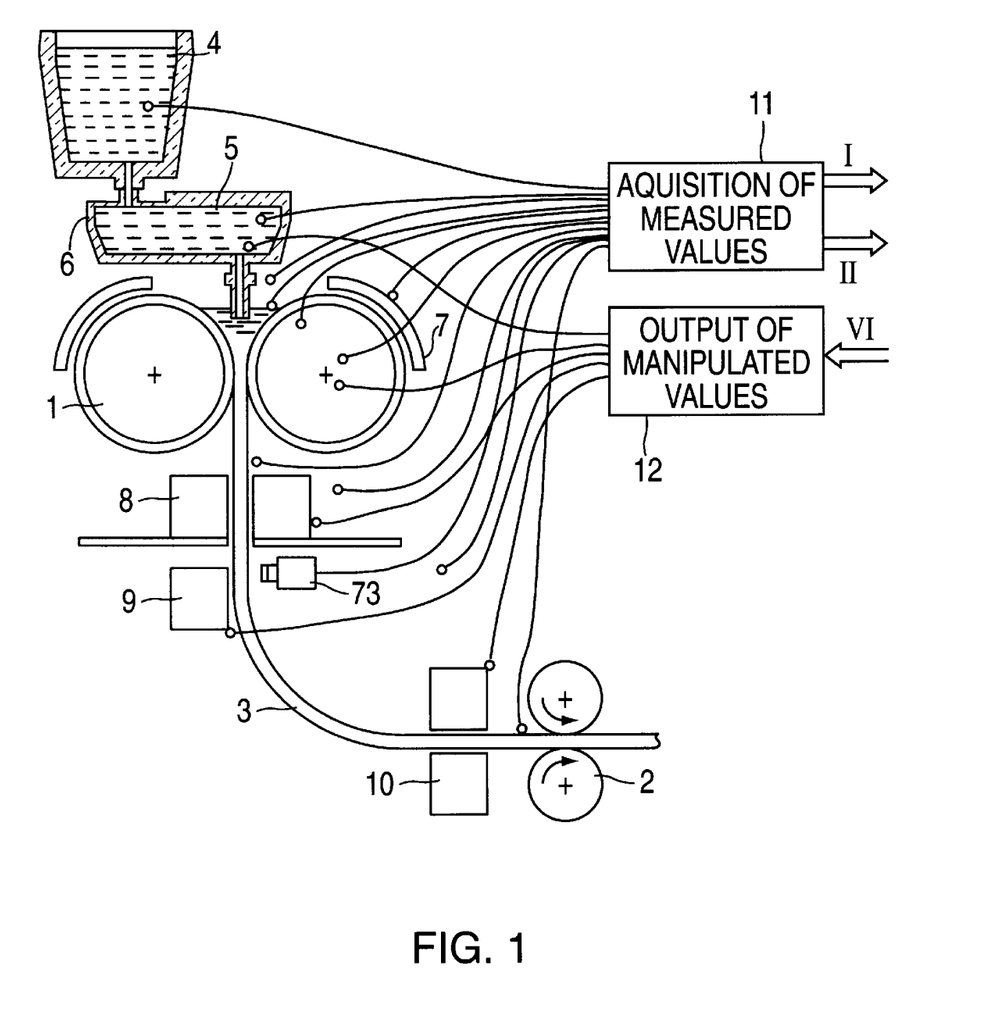
FIG. 1 shows a representation of a continuous casting plant with acquisition of measured values and output of manipulated variables, in accordance with the present invention.

FIG. 1 shows the casting rolls 1 of a twin-roll casting bay, where the material, e.g., molten steel, is fed from foundry ladle 4 through tundish 5 and a submerged tube 6 between casting rolls 1 and solidifies to a strip 3 which can be shaped further in a rolling mill, represented by circles 2 with arrows indicating the direction of movement. The downstream rolling mill can also be replaced by conveyor rolls, a coiler, etc., if the strips are not to be rolled out immediately after casting. The installation as a whole is designed according to specific requirements. Designing the installation downstream from the casting apparatus as a hot-cold roll mill is also possible and is advisable at very high casting speeds, because then the cold rolling part of the installation can be adequately utilized.

Between the casting rolls and the downstream equipment, the continuous casting installation preferably has an electrodynamic system 8, 9, likewise indicated only symbolically, and an induction heating system 10. Electrodynamic system part 8 serves to relieve the burden on cast strip 3, which is still very soft here and is thus at risk of necking, and electrodynamic system part 9 serves to guide strip 3, while induction heating system 10 is responsible for maintaining a predetermined temperature profile over the width of the strip when direct postforming is performed in a downstream rolling installation, for example. This is advantageous for steels that are susceptible to cracking in particular. Cast strip 3 is monitored for cracks by a camera 73, where the influence of cracks in the base material on the crack pattern in the scale can be utilized to advantage. A measured quantity is formed to advantage by a neuro-fuzzy system.

Since the surface temperature of the casting rolls should be essentially constant to prevent thermal shock stresses, the rolls are kept at the working temperature by an IR heating system 7, an induction heating system, etc., even in the area that is not in contact with molten steel. These components and other individual components of the continuous casting installation, only the rough outlines of which are shown, are set directly or regulated, e.g., by temperature regulators, flow adjusters, speed controllers, etc., as part of the basic automation or via a manipulated variable output 12. The actual data of the actuators, controllers, etc., are combined and processed in measured data acquisition 11 for the data memory and model input as well as for the basic automation by another method not shown here. The continuous casting plant, where the steel solidification shells formed by the two casting rolls 1 are not only combined but also shaped by rolling in a manner that preserves the initial dimensions, are connected to the intelligent part of the control system by data transmissions I, II and VI, which are represented by arrows.

Figure 2:
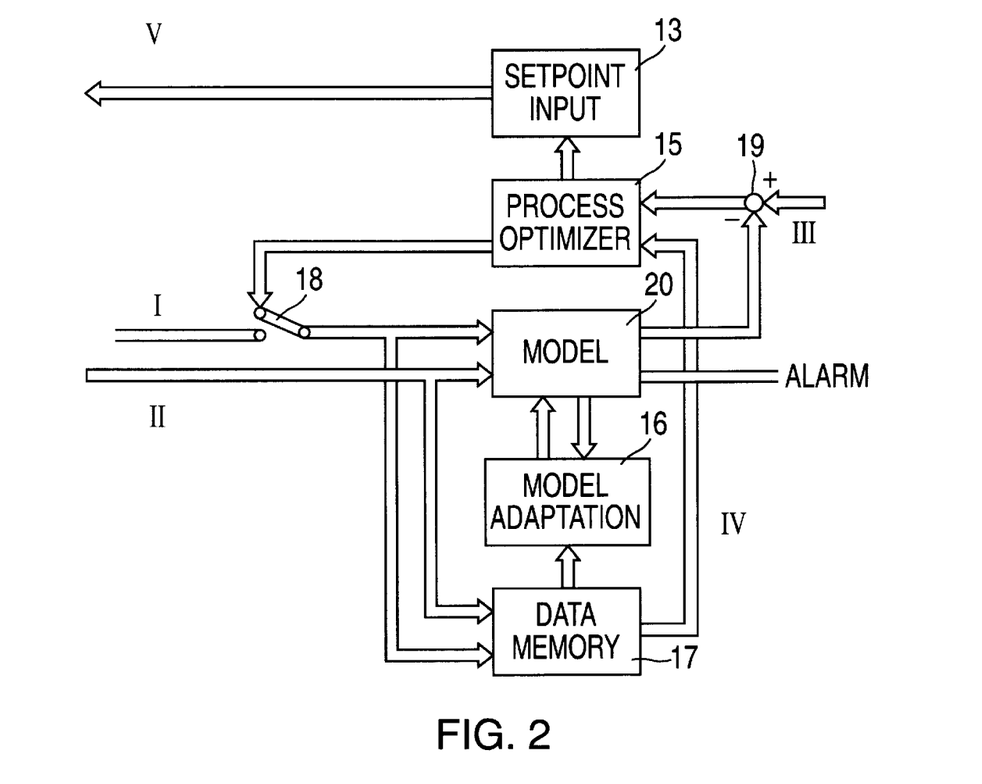
FIG. 2 shows an "intelligent" part of a control system with setpoint generation.

FIG. 2 shows the structure of the intelligent part of the control system. It includes a process optimizer 15, model 20, model adaptation 16 and data memory 17. These parts of the control system work together so that the best possible instructions, suitable for the situation, are made available for process control over data line V via setpoint output 13. These instructions are then converted to setpoints for the basic automation. The task and function of the individual parts are described below.

Model 20 simulates the static process behavior $$y_i = f_i(u_1, \ldots, u_i, \ldots, v_1, \ldots, v_i, \ldots),$$

i.e., the dependence of n model output variables $\tilde{y}_i$ on manipulated variables $u_i$ with which the process can be influenced and on non-controllable process variables $v_i$ such as the temperature of the cooling water. As mentioned previously, the model output quantities are typical quality parameters of the product. The model description $$\tilde{y}_i = \tilde{f}_i(u_1, \ldots, u_i, \ldots, v_1, \ldots, v_i, \ldots),$$

does not describe the process behavior accurately in general, which is why $y_i$ and $\tilde{y}_i$ deviate more or less from each other. Manipulated variables $u_i$ and non-controllable manipulated variables $v_i$ are transmitted over data lines I and II.

The function of model adaptation 16 is to improve the model so that the model behavior corresponds to the process behavior as closely as possible. This can be done on-line, at least for parts of the model, in that these model parts are adapted or corrected on the basis of continuously measured process data.

For other model parts, the adaptation can also be performed off-line at certain times. This is done as a function of a number m of process states ($u_i^k$, $v_i^k$, $y_i^k$) representing the process, these states being filed in data memory 17.

Superscript k denotes the respective process state. In this type of adaptation, the model error $$\varepsilon = \sum_{k=1}^{m} \sum_{i=1}^{n} (y_i^k - y_i^{-k})^2$$

$$= \sum_{k=1}^{m} \sum_{i=1}^{n} (f_i(u_1^k, \ldots, u_i^k, \ldots, v_1^k, \ldots, v_i^k, \ldots) -$$

$$\tilde{f}_i(u_1, \ldots, u_i, \ldots, v_1, \ldots, v_i, \ldots))^2$$

is minimized as a function of the model parameters or the model structure. In other words, the model parameter or model structure is varied so that $\Sigma$ is minimized.

Process optimizer 15 finds manipulated variables $u_i$ using an optimization process and the process model so that the best possible process behavior is obtained. Process optimizer 15 operates off-line at certain points in time, which can be preset manually, for example, as follows:

First, the non-controllable manipulated variables $v_i$ for which the optimization is to be performed—e.g., the up-to-date variables—are kept constant and sent to the model over data line II. Then the process optimizer is connected to the model by switch 18, which sends control outputs $u_i$ to the model 10. Output values $\tilde{y}_i$ are determined via the model 10 are compared with setpoint output values $y_{Soll,j}$ and the error is determined:

$$E = \sum_{i=1}^{n} (y_{Soll,j} - \tilde{y}_i)^2$$

The error E should be minimized. For this purpose, the process optimizer varies manipulated variables $u_i$ in an iterative loop containing the calculation of $y_i$ and E as well as the new value selected for $u_i$ until the error cannot be reduced further or this optimization is terminated. Suitable optimization processes include genetic algorithms, hill climbing methods, etc.

The resulting optimal manipulated variables $u_{opt,j}$ which are the result of the above minimization are then transferred as setpoints to the basic function system via the setpoint input and data line V.

The main function of the data memory 17 is to archive representative process states ($u_i$, $v_i$, $y_i$). The data memory repeatedly replaces old process data by newly determined process data to permit an up-to-date process description, although at only one point, as a function of these data. The data memory then supplies the model adaptation, as described above. It also supplies starting values $u_i$ for the process optimizer. The starting values are selected, for example, so that output values $y_i$ belonging with these starting values correspond as well as possible to setpoints $y_{soll,i}$.

Therefore, the preferably off-line loop consisting of model 20 and process optimizer 15, which uses genetic algorithms, for example, for evolutionary model improvement, preferably operates off-line because the computation time of an evolutionary optimization process is comparatively long due to the complexity of a plant control model with its many possible embodiments. Even with good optimization strategies, which are selected on the basis of an analysis of the probable model behavior, for example, numerous optimization procedures must be calculated through until achieving a definite model improvement.

The creation of a model structure to be used according to the present invention and an important partial model is described, for example, in the article "Automation of a laboratory plant for direct casting of thin steel strips" by S. Bernhard, M. Enning and H. Rabe in *Control Eng. Practice*, vol. 2, no. 6 (1994) pages 961–967, Elsevier Science Ltd. This publication describes the basic structures of suitable basic automation systems and start routines on which those skilled in the art can build.

Computers for process optimization and parameter adaptation include workstations such as those available from Sun. For large control systems, computers operating in parallel are advantageous. This is true in particular when the model can be divided into groups of model modules that can be optimized partially independently of each other.

Figure 3:
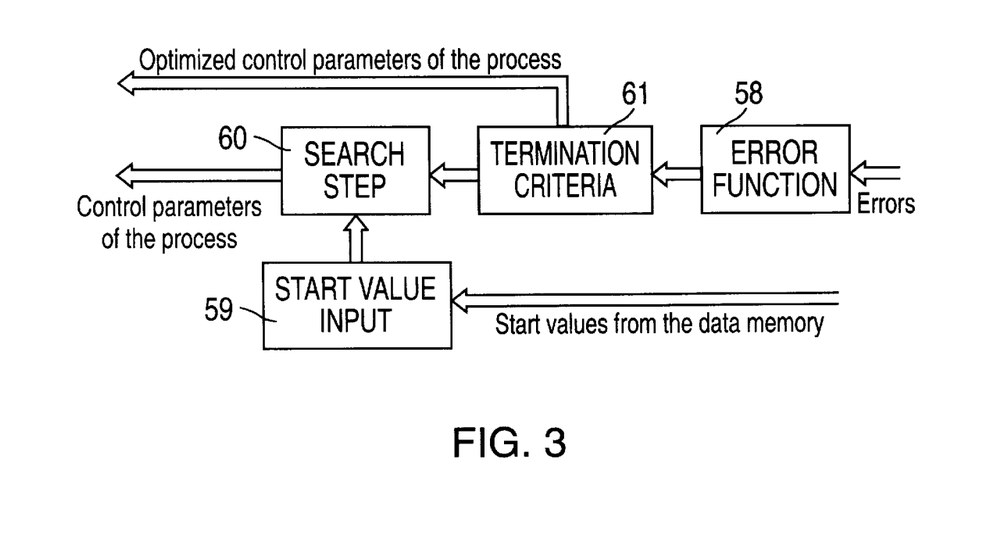
FIG. 3 shows a process optimizer.

At reference point 19, where the setpoints (in the example selected here, the setpoints for the strip thickness, the shape of the section, the surface quality of the strip, etc.) converge, the results of the model calculation are continuously compared with the setpoint inputs. The difference is to be minimized by optimization. Since the difference in industrial processes cannot in general be zero, the optimization process must be limited in a reasonable manner, i.e., terminated at a predetermined point. FIG. 3 shows more specific details of the program structure with which the optimization is terminated and the new setpoint output is started.

FIG. 3 shows an error function 58 which is to be selected in each case and which receives the detected error (setpoint deviations). Then a check is performed at 61 to determine whether the error function meets the termination criteria of the optimization. If this is the case, further optimized controlled variables are output. Before the termination criterion is reached, start values go continuously from the data memory to the start value input 59, from which control parameters for a suboptional process control are obtained in search steps at 60, not by the optimizer but instead from the data memory, e.g., using a fuzzy interpolation. A switch takes place after reaching the predetermined quality factor, which is adapted to the respective control system knowledge level. As stated above, the minimization, which can never be absolute, is terminated on reaching the predetermined quality factor.

If model 20 is connected to the process, i.e., switch 18 is closed, it is also advantageous if an alarm signal is generated from model 20 to signal that critical operating states have been reached. Such procedures are already known and are used similarly in conventional control systems.

Figure 4:
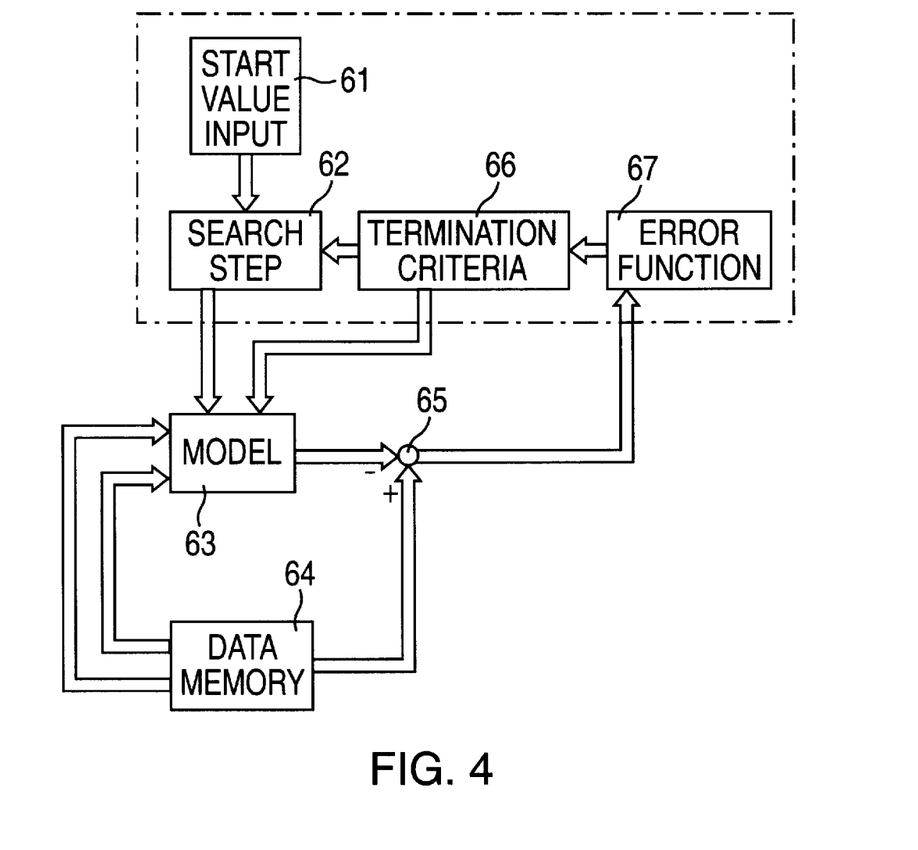
FIG. 4 shows an adaptation process according to the present invention.

In FIG. 4, which shows the structure of a model adaptation by an optimization algorithm, data go from start value input 61 to a search step unit 62, where the data are relayed as model parameters to model 63. Model 63 together with data memory 64 forms a parameter improvement loop which compares the values formed and those saved in 65 in a known way. The comparison values are sent to error function 67, which relays its values to termination criteria unit 66. If the termination criteria are met, the model is not improved further and the existing values are used. Otherwise, optimization is continued with additional search steps and the intermediate values in the data memory.

Figure 5:
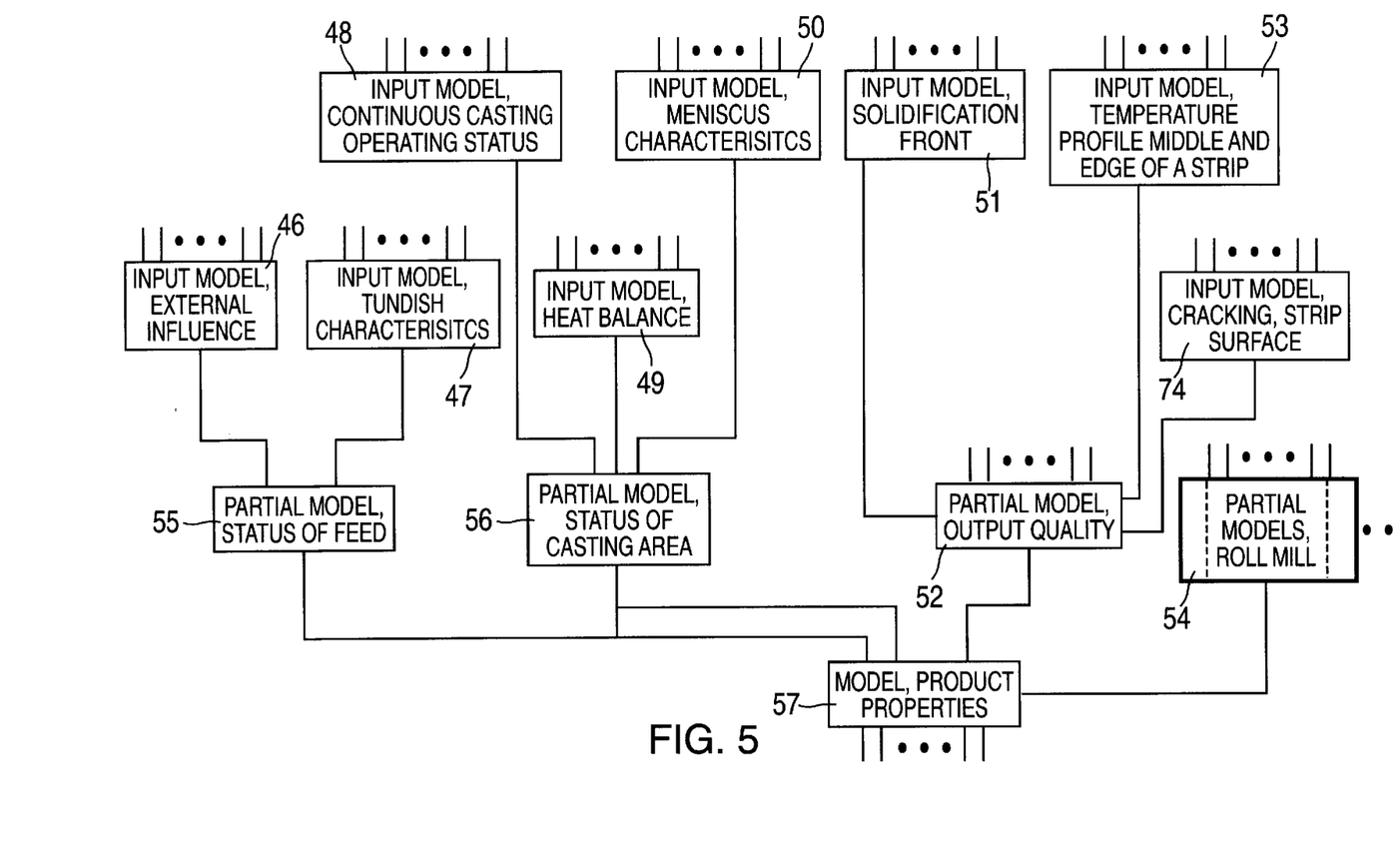
FIG. 5 shows components of the process model and a logic macro-structure.

In FIG. 5, which shows the essential partial models of the overall process model of the embodiment, according to the present invention input model 46 combines the outside influences such as the effects of the quality of the starting material. The starting quality of the steel yields, for example, liquidus and solidus values as well as other parameters characterizing the casting behavior. Data entered into tundish model 47 include, for example, the steel volume in the tundish, the position of the submerged tube, etc., the stopper position and the steel outflow temperature. Input models 46 and 47 are combined in partial model 56 which reflects the status of the material supplied. Such partial models can be optimized in parallel with other partial models, such as the casting area model, the rolling area model, etc.

Input model 48 contains the influences affecting solidification, such as the cooling of the casting rolls, the infrared heating, etc. Input model 49 contains the values needed for the heat balance, such as the temperature difference between the steel and the casting rolls, the lubricant influence as a function of lubricant quantity, the rate of crystallization of the given grade of steel and the surface condition of the rolls, for example. Input model SO contains, for example, the effects of the meniscus characteristics, such as the height of the meniscus, the thickness of the slag layer and the emission coefficient. Input models 48, 49 and 50 are combined in partial model 54 which shows the status of the casting area. This model area combination is advantageous in general for production areas because it simplifies and improves the overall model optimization. The partial models are still dependent on each other to some extent, e.g., input model 49 (heat balance input model) and input model 50 (meniscus characteristic input model) to a significant extent. No secondary dependences are presented for the sake of simplicity.

Partial model 51 contains all the influences on the solidification front, i.e., in the area where the metal shells that have solidified on the two cooling rolls meet. These influences include essentially forming energy expended by the casting rolls, the vibration width of the casting rolls or the discharged strip, the side gap sealing effects and the degree of constraint of the system as a whole, which is a fuzzy model, for example. Partial model 52 shows the discharge values, such as the quality of the strip, the discharge temperature and distribution, but also the tendency to stick and the condition of the scale formed. Partial model 52 also includes input model 53 and input model 74, which are based on the temperature profile across the strip and the surface condition of the strip. For the particularly advantageous case of a continuous strip casting roll mill, the roll mill partial models 54 are also included in this special process model because the formation of the product after discharge from the roll stand is the decisive criterion.

The partial models are combined into product formation model 57, which combines the thickness profile of the strip formed, the strip thickness, the error pattern, if any, the grain structure of the strip, the surface structure, etc. The surface structure and in particular the grain structure of the strip can be determined only with a considerable time lag. Therefore, it is advantageous to work here with partial models on the basis of neural networks for qualitative and quantitative determination of influencing parameters.

The preceding discussion yields an advantage which is obtained from the modular structure of the model, because the parts of a complex overall process model in particular can be processed in parallel in this way. This is advantageous especially for the start-up phase of an installation, when the input models and partial models must be adapted to the actual conditions, linked together, etc.

Figure 6:
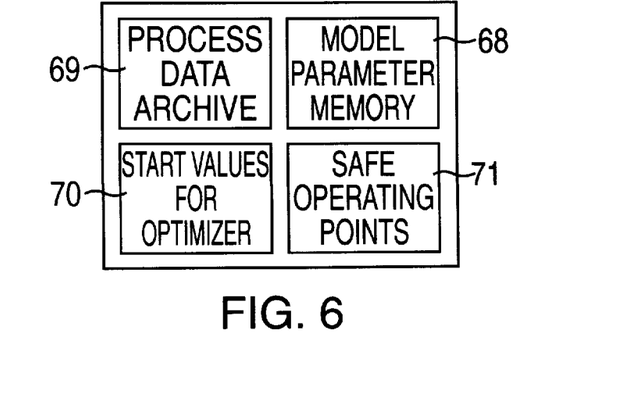
FIG. 6 shows portions of a data memory to be used with the present invention.

Finally, FIG. 6 shows the essential part of the data memory structure according to the present invention, which shows process data archive 68, model parameter memory part 69, part 70 with the start values for the optimizer and memory part 71 for the safe operating points. The respective model structure is also stored at 68.

A variety of functions must be fulfilled by the basic automation, which forms an indispensable part of the control system with its open- and closed-loop controls, interlocking, etc., because it guarantees reliable operation of the installation even in the event of a malfunction of the model part of the control system operating according to this invention.

Figure 7:
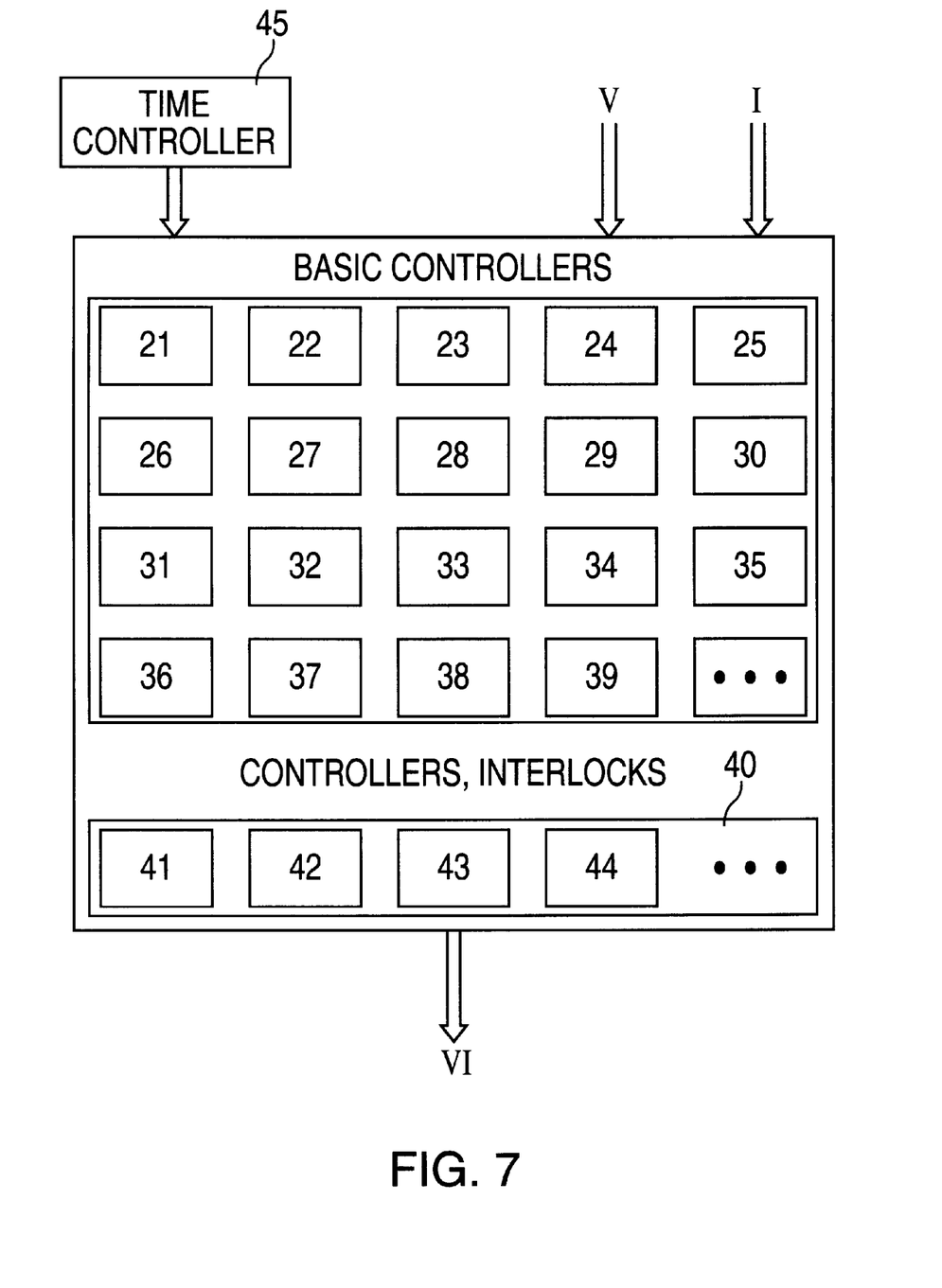
FIG. 7 shows a component diagram of a basic automation.

The individual functions are represented by the single "black box" in FIG. 7, although not definitively. In this embodiment, according to the present invention 21 denotes the mass flow control using of the individual speed controller, 22 denotes the control over tundish heating, 23 denotes the meniscus control, 24 is the tundish outflow control and 25 is the heating power of the infrared, etc., shield 7 for maintaining the operating temperature of the casting rolls. 26 denotes the control of lubricant addition, e.g., in the form of loose casting powder or casting powder paste applied to the casting rolls, 27 denotes the regulation of cooling water flow, 28 may denote the roll oscillation control, 29 is the electric drive control and 30 is the roll nip setting. 31 denotes the roll speed control and 32 may denote the control of the roll torque, 33 is the setting of the cleaning system consisting, for example, of a brush and a scraper for the casting rolls, 34 is the control of the electrodynamic system for equalizing the strip weight and 35 is the control of the vibration width of the cast strip. 36 denotes the control of the individual parts of an electrodynamic system for sealing the side gap and 37 is the control of the heating for the side walls of the space between the casting rolls. 38 denotes the temperature profile control of induction heating system 10. 39 and other control units indicated denote control of the downstream forming units, e.g., roll stands, the drive between these roll stands, etc. Time controller 45, which coordinates the timing of the manipulated variable outputs, etc., acts on the above-mentioned actuators, controllers, etc. For example, the auxiliary controllers and interlocks are combined in block 40, e.g., automatic start control 41, automatic shut-off 42, interlocks 43 and 44, which prevent, for example, the flow of molten steel before the pair of casting rolls and the forming rolls are ready to operate, etc. Furthermore, additional systems (not shown in the schematic diagram) are also provided, e.g., for separating the strip edge by laser, if necessary, for influencing the scale, e.g., by silicating, for lubrication of the rolls, etc. In the basic automation, which receives measured data I and setpoint inputs V, manipulated variables VI are generated and used to control the installation.

The characteristics of the self-optimizing, intelligent, adaptive control system are explained in greater detail below on the example of the continuous casting process.

The continuous casting process consists of a number of subprocesses whose characteristics and influences are crucial for the end product. The properties of the end product, e.g., its thickness, its thickness profile and its surface properties, can be influenced and optimized according to the present invention by a number of adjustable process parameters, such as the casting roll gap, the casting roll profile, the height of the meniscus, etc., which in turn influence the location of the zone where the solidified metal shells deposited on the casting rolls are joined. According to the present invention, an overall process model that describes the process behavior is created for control and optimization. On the basis of this process model, the influencing variables with which the process is controlled are adapted and optimized step-by-step according to the process conditions. The instructions suitable for the situation that are determined by this optimization then lead to an improvement in the conduction of the process. On the whole, despite the development cost of software (although it can also be used in other installations with little additional cost) this yields a considerable cost advantage because the installation can operate with much simpler mechanical components, fewer controllers, etc., than the known installations. The sensor technology is also much simpler because only the process output quantities need be detected continuously and accurately.

The intelligent, automatically adapting part of the control system is composed of three essential elements: the process model, the model adaptation and the process optimizer. The process model is composed of subsystems (modules) of different types, depending on the process knowledge. If the physical relationships are known, traditional physical mathematical models can be created. However, if only empirical information or estimates are available, fuzzy systems or neuro-fuzzy systems are used. If little or nothing is known about the process behavior, such as the cracking and the surface properties, neural networks are used to establish the process, at least at the beginning. On the whole, the model describes the relationship between the process variables, e.g., in this example, the meniscus height, the state variables and the quality of the cast material, the settings of the casting rolls, etc., and the quality parameters of the strip, e.g., thickness, profile and surface structure.

The model is not accurate, because a certain (sometimes considerable) percentage of it is based on uncertain information. The model must therefore be adapted, modified, etc., on the basis of measured process data. This is accomplished to advantage by means of the known model adaptation, which is based on data from past process states. On the basis of these data, it sets the model parameters, etc., in such a way that the model behavior corresponds as closely as possible to that of the process. Furthermore, the models themselves are adapted and optimized, e.g., by genetic algorithms, combinational evolution, etc. Such optimization strategies are known, e.g., from Ulrich Hoffmann, Hanns Hofmann, *Einführung in die Optimierung* (Introduction to Optimization), Verlag Chemie GmbH, 1971, Weinheim, Bergstrasse; H. P. Schwefel, *Numerische Optimierung von Computer-Modellen mittels der Evolutionsstrategie,* (Numeric Optimization Computer Models by Evolution Strategy) Basel, Stuttgart: Birkhäuser, 1977; Eberhard Schön, *Genetische Algorithmen und Evolutionsstrategien,* Bonn, Paris, Reading, Mass., Addison-Wesley, 1994; Jochen Heistermann, *Genetische Algorithmen: Theorie und Praxis evolutionärer Optimierung,* (Generic Algorithm: Theory and Practice of Evolutionary Optimization) Stuttgart, Leipzig, Teubner, 1994 (Teubner-Texte zur Informatik; (Tuebner Texts on Computer Science vol. 9).

The control system according to present invention and the procedure according to this invention as described above depart from the previous structure of a control system. On a level above a basic automation that concerns essentially the process level (level I) there is a one-step intelligent control system receiving the production setpoint values as input and automatically generating from them all the control commands (level II). In intelligent self-optimization, it ensures progressively better process results on the basis of the process results already achieved. Individual feedback control circuits can be eliminated. Quality control sensors are necessary only for monitoring the process results. The control system according to this invention thus has only two essential levels, the intelligent level of which needs no visualization except for programming. However, the elements of the basic automation can be visualized in a known way for verification purposes.

What is claimed is:

1. An intelligent computerized control system for controlling a facility carrying out a process, the system comprising:
    a storage arrangement storing previously input knowledge data;
    a determining arrangement determining a status of the process from results of the process by building on the previously input knowledge data; and
    a generating arrangement generating instructions for controlling the process so as to achieve goals appropriate for a set of conditions,
    wherein the process includes individual subprocesses, and wherein at least one of the processes and the individual subprocesses is continuously simulated as a function of a process simulation model for at least one of an adaptation and an optimization, the process simulation model being structurally modular and being descriptive of a behavior between process input parameters and process output parameters,
    wherein the process simulation model is optimized by an evolutionary process including an optimization process, the optimization process being selected according to the set of conditions, and
    wherein the optimization process is selected as a function of at least one of a number of variables to be optimized and expected minimums.

2. An intelligent computerized control system for controlling a facility carrying out a process, the system comprising:
    a storage arrangement storing previously input knowledge data;
    a determining arrangement determining a status of the process from results of the process by building on the previously input knowledge data; and
    a generating arrangement generating instructions for controlling the process so as to achieve goals appropriate for a set of conditions,
    wherein the process includes individual subprocesses, and wherein at least one of the processes and the individual subprocesses is continuously simulated as a function of a process simulation model for at least one of an adaptation and an optimization, the process simulation model being structurally modular and being descriptive of a behavior between process input parameters and process output parameters,
    wherein the process simulation model is optimized by an evolutionary process including an optimization process, the optimization process being selected according to the set of conditions, and
    wherein the optimization process includes at least one of a genetic algorithm, a Hooke-Jeeves method and a simulated annealing method.

3. An intelligent computerized control system for controlling a facility carrying out a process, the system comprising:
    a storage arrangement storing previously input knowledge data;
    a determining arrangement determining a status of the process from results of the process by building on the previously input knowledge data; and
    a generating arrangement generating instructions for controlling the process so as to achieve goals appropriate for a set of conditions,
    wherein the process includes individual subprocesses, and wherein at least one of the processes and the individual subprocesses is continuously simulated as a function of a process simulation model for at least one of an adaptation and an optimization, the process simulation model being structurally modular and being descriptive of a behavior between process input parameters and process output parameters, and
    wherein starting values for the optimization are determined as a function of suboptimum operating data archived in a process data memory.

4. An intelligent computerized control system for controlling a facility carrying out a process, the system comprising:
    a storage arrangement storing previously input knowledge data;
    a determining arrangement determining a status of the process from results of the process by building on the previously input knowledge data; and
    a generating arrangement generating instructions for controlling the process so as to achieve goals appropriate for a set of conditions,
    wherein the process includes individual subprocesses, and wherein at least one of the processes and the individual subprocesses is continuously simulated as a function of a process simulation model for at least one of an adaptation and an optimization, the process simulation model being structurally modular and being descriptive of a behavior between process input parameters and process output parameters,
    comprising a basic function system for converting the instructions into process control,
    wherein the basic function system includes a basic automation system allowing the process components to carry out the process, and
    wherein the basic automation system includes an autonomous subsystem ensuring a safe condition of at the process, the basic automation system falling back on safe operating values stored in a data memory.

5. An intelligent computerized control system for controlling a facility carrying out a process, the system comprising:
    a storage arrangement storing previously input knowledge data;
    a determining arrangement determining a status of the process from results of the process by building on the previously input knowledge data; and
    a generating arrangement generating instructions for controlling the process so as to achieve goals appropriate for a set of conditions,
    wherein the process includes individual subprocesses, and wherein at least one of the processes and the individual subprocesses is continuously simulated as a function of a process simulation model for at least one of an adaptation and an optimization, the process simulation model being structurally modular and being descriptive of a behavior between process input parameters and process output parameters, comprising a basic function system for converting the instructions into process control, and wherein the basic function system performs start-up routines and ramp-up routines, the basic function system further performing suboptimal normal operating routines in which individual instructions are replaceable by constant input values.

6. An intelligent computerized control system for controlling a facility carrying out a process, the system comprising:

a storage arrangement storing previously input knowledge data;

a determining arrangement determining a status of the process from results of the process by building on the previously input knowledge data; and a generating arrangement generating instructions for controlling the process so as to achieve goals appropriate for a set of conditions, wherein the process includes individual subprocesses, and wherein at least one of the processes and the individual subprocesses is continuously simulated as a function of a process simulation model for at least one of an adaptation and an optimization, the process simulation model being structurally modular and being descriptive of a behavior between process input parameters and process output parameters, comprising a basic function system for converting the instructions into process control, and wherein the basic function system includes a time controller for transferring predetermined setpoint values.

7. The intelligent computerized control system according to claim 6, wherein control commands for the basic function system can be generated from data stored in a process database and wherein an interpolation is performed between stored safe operating data.

8. An intelligent computerized control system for controlling a facility carrying out a process, the system comprising:

a storage arrangement storing previously input knowledge data;

a determining arrangement determining a status of the process from results of the process by building on the previously input knowledge data; and a generating arrangement generating instructions for controlling the process so as to achieve goals appropriate for a set of conditions, wherein the process includes individual subprocesses, at least one of the individual subprocesses is continuously simulated as a function of a process simulation model, the process simulation model being structurally modular and being descriptive of a behavior between process input parameters and process output parameters.

9. The intelligent computerized control system according to claim 8, wherein the individual subprocesses is continuously simulated for at least one of an adaption and an optimization.

* * * * *